United States Patent
Kato et al.

(10) Patent No.: US 7,210,215 B2
(45) Date of Patent: May 1, 2007

(54) METHOD OF MANUFACTURING STATOR WINDING OF ROTARY ELECTRIC MACHINE

(75) Inventors: Mitsuru Kato, Anjo (JP); Yasunori Kitakado, Okazaki (JP); Motohiro Murahashi, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/117,438

(22) Filed: Apr. 29, 2005

(65) Prior Publication Data

US 2005/0188532 A1    Sep. 1, 2005

Related U.S. Application Data

(62) Division of application No. 10/445,885, filed on May 28, 2003, now Pat. No. 6,903,479.

(30) Foreign Application Priority Data

Jun. 3, 2002    (JP)    ............................. 2002-161262

(51) Int. Cl.
*H02K 15/04* (2006.01)

(52) U.S. Cl. ........................................ 29/596; 310/201

(58) Field of Classification Search ................. 29/596, 29/598, 825, 826, 874, 882, 605; 310/180, 310/184, 201, 179
See application file for complete search history.

(56) References Cited

U.S. PATENT DOCUMENTS

| | | | |
|---|---|---|---|
| 596,136 A | 12/1897 | Batchelder | 310/208 |
| 688,317 A | 12/1901 | Lamme | 310/198 |
| 1,784,815 A | 12/1930 | Apple | 310/211 |
| 2,476,743 A * | 7/1949 | Leece | 72/382 |
| 4,315,179 A | 2/1982 | Davey | 310/184 |
| 4,336,474 A | 6/1982 | Davey | 310/179 |
| 4,346,320 A | 8/1982 | Davey | 310/179 |
| 5,211,670 A * | 5/1993 | Ohmi et al. | 29/598 |
| 5,266,858 A | 11/1993 | Ohmi et al. | 310/208 |
| 5,704,114 A * | 1/1998 | Iguchi | 29/735 |
| 6,222,295 B1 | 4/2001 | Umeda et al. | 310/179 |
| 6,249,956 B1 * | 6/2001 | Maeda et al. | 29/596 |
| 6,314,780 B1 | 11/2001 | Naka et al. | 72/213 |
| 6,339,871 B1 * | 1/2002 | Maesoba et al. | 29/596 |
| 6,425,175 B1 * | 7/2002 | Sawada et al. | 29/596 |
| 6,441,527 B1 * | 8/2002 | Taji et al. | 310/201 |
| 6,525,443 B2 * | 2/2003 | Asao | 310/201 |

(Continued)

FOREIGN PATENT DOCUMENTS

EP    0 945 962 A1    9/1999

(Continued)

*Primary Examiner*—Peter Vo
*Assistant Examiner*—Livius R. Cazan
(74) *Attorney, Agent, or Firm*—Oliff & Berridge, PLC

(57) ABSTRACT

A method of manufacturing a winding includes steps of twisting U-shaped conductor segments, inserting straight portions of the twisted conductor segments in slots of a stator core, bending ends of the straight portions in a circumferential direction of the stator core and joining the ends. The method further includes a step of pressing turn portions of the U-shaped conductor segments by a turn portion twisting apparatus such that widths of the turn portions reduce in radial directions. The pressing step is performed simultaneously with the twisting step. Alternatively, the pressing step is performed after the twisting step.

7 Claims, 11 Drawing Sheets

U.S. PATENT DOCUMENTS

| | | | |
|---|---|---|---|
| 6,762,528 B2 * | 7/2004 | Wada et al. | 310/201 |
| 2001/0007169 A1 | 7/2001 | Takahashi et al. | 29/596 |
| 2003/0005579 A1 | 1/2003 | Takahashi et al. | 29/732 |

FOREIGN PATENT DOCUMENTS

| | | |
|---|---|---|
| EP | 1 124 305 A2 | 8/2001 |
| EP | 1 176 695 A2 | 1/2002 |
| JP | A 56-71454 | 6/1981 |
| JP | U-58-34574 | 3/1983 |
| JP | A-58-148643 | 9/1983 |
| JP | A-2000-278920 | 10/2000 |
| JP | 2000343137 A * | 12/2000 |
| JP | 2001037132 A * | 2/2001 |
| JP | A 2001-37132 | 2/2001 |
| JP | A-2002-44890 | 2/2002 |
| KR | 90-0000101 | 1/1990 |

* cited by examiner

METHOD OF MANUFACTURING STATOR WINDING OF ROTARY ELECTRIC MACHINE

CROSS REFERENCE TO RELATED APPLICATION

This is a Division of application Ser. No. 10/445,885 filed May 28, 2003 now U.S. Pat. No. 6,903,479. The entire disclosure of the prior application is hereby incorporated by reference herein in its entirety.

This application is based on Japanese Patent Application No. 2002-161262 filed on Jun. 3, 2002, the disclosure of which is incorporated herein by reference.

FIELD OF THE INVENTION

The present invention relates to a method of manufacturing a stator winding of a rotary electric machine, such as a vehicular alternator installed on passenger vehicles or trucks, and structure of a winding and a method of manufacturing the winding.

BACKGROUND OF THE INVENTION

In recent years, it has been required to improve power generation performance of a vehicular alternator in accordance with an increase in current consumed by safety control apparatus. To meet the requirement, it is proposed to improve power output of a stator by increasing occupancy of the electric conductors in slots of the stator by regularly arranging U-shaped electric conductors in the slots. This kind of stator is disclosed in JP-A-2001-45721 (U.S. Pat. No. 6,314,780) and JP-B2-31 18837 (U.S. Pat. No. 6,249,956), for example.

According to the method disclosed in JP-B2-31 18837, breakage of an insulation film at a turn portion of a U-shaped electric conductor due to excess concentration of stress is reduced by increasing an inside dimension or diameter of the turn portion for some amount, even if an overall width of straight portions of the U-shaped electric conductor including a gap between them is small.

However, when the inside dimension of the turn portion is increased to reduce the breakage of the insulation films, an outside width of the turn portion increases for the amount. Therefore, in a stator winding constructed of the U-shaped electric conductors, the turn portions largely protrude from an outer circumferential end and an inner circumferential end of a stator core in a radial direction. As a result, the turn portions are likely to interfere with a housing located on an outer periphery of the stator and other components such as a rotor located radially inside of the stator.

SUMMARY OF THE INVENTION

The present invention is made in view of the foregoing disadvantages and it is an object of the present invention to provide a method of manufacturing a stator winding of a rotary electric machine, which is capable of reducing dimensions of turn portions of the stator winding in a radial direction of a stator core.

It is another object of the present invention to provide a structure of a winding and a method of manufacturing the winding, which is capable of reducing a dimension of the winding in a predetermined direction.

According to a first aspect of the present invention, a method of manufacturing a stator winding of a rotary electric machine includes steps of twisting U-shaped conductor segments, inserting first and second straight portions of the segments into slots of a stator core, bending ends of the straight portions in a circumferential direction of the stator core and joining the ends of the straight portions. In the twisting step, the first straight portion and the second straight portion are moved relative to each other in circumferential directions. Further, the method includes a step of pressing a turn portion of the conductor segment such that a dimension of the turn portion reduces in its radial direction.

Because the turn portions are press-shaped, the turn portions are restricted from protruding in the radial direction of the stator core in the winding without causing stress concentration on inner peripheral sides of the turn portions. Preferably, the pressing step is performed simultaneously with the twisting step. Alternatively, the pressing step is performed after the twisting step.

According to a second aspect of the present invention, a structure of a winding includes straight portions and curved portions. The curved portions include curves that protrude perpendicular to longitudinal directions of the straight portions. Further, the curves are inclined with respect to longitudinal directions of the curved portions other than the curves when viewed along the longitudinal directions of the straight portions.

The curved portions construct turn portions of the winding. Because the curves are inclined, the curves are restricted from protruding in a predetermined direction in the winding, without increasing stress concentration at the turn portions.

According to a third aspect of the present invention, a method of manufacturing a winding includes a step of forming substantially a U-shaped electric conductor by bending a longitudinal wire so that the electric conductor has a first straight portion, a second straight portion and a curved portion that includes a curve protruding in a direction perpendicular to longitudinal directions of the straight portions when viewed along the longitudinal directions of the straight portions. The method further includes a step of inclining the curve with respect to a longitudinal direction of the curved portion other than the curve when viewed along the longitudinal directions of the straight portions.

The curved portions construct turn portions of the winding. Because the curved portions are inclined, the winding is restricted from protruding in a predetermined direction.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EMBODIMENT

Figure 1:
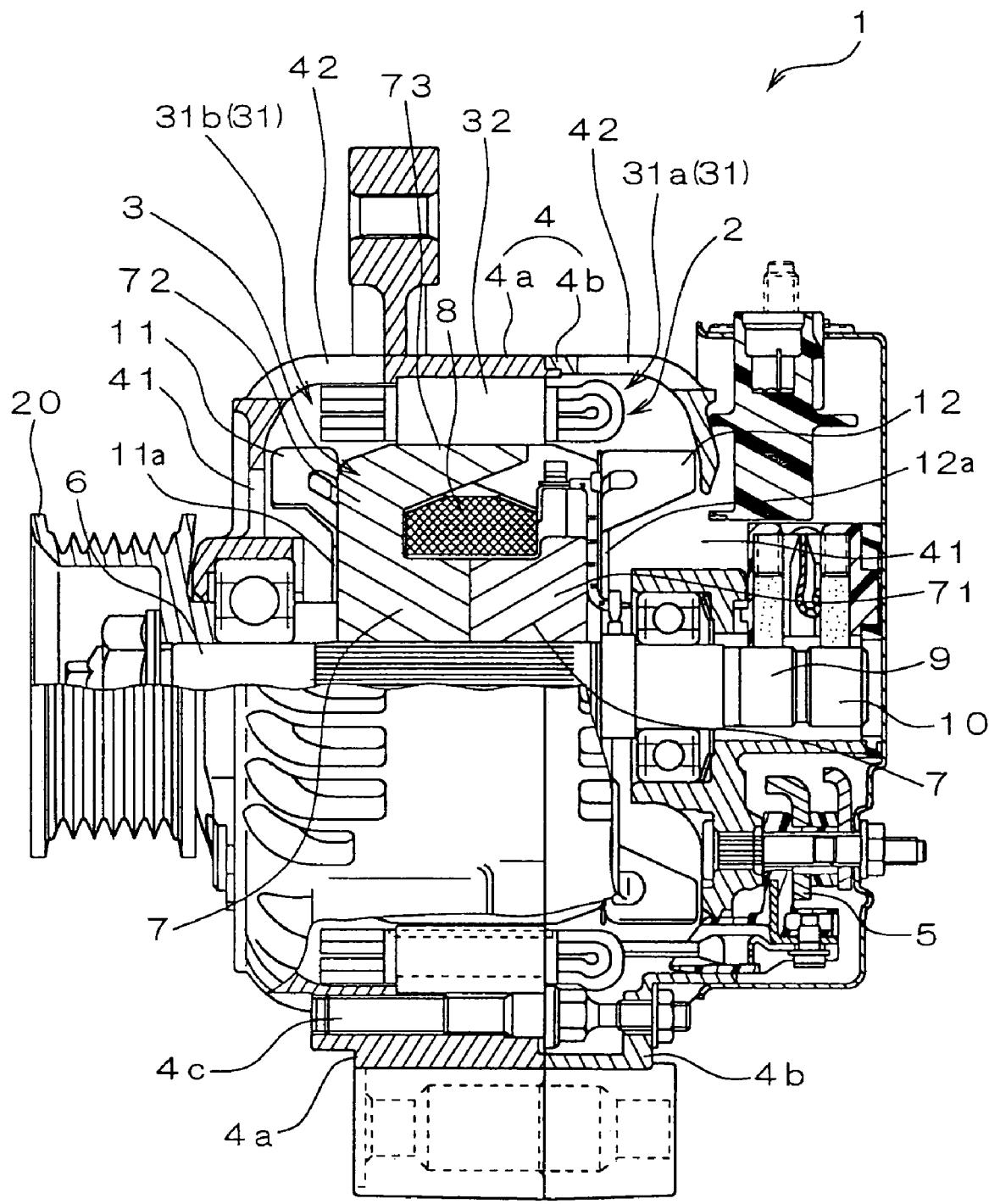
FIG. 1 is a schematic cross-sectional view of a vehicular alternator according to an embodiment of the present invention.

A method of manufacturing a stator winding of a rotary electric machine in which an embodiment of the present invention is applied will be described in detail with reference to accompanying drawings. As shown in FIG. 1, a vehicular alternator 1 of the embodiment includes a stator 2, a rotor 3, a housing 4, a rectifier 5 and the like.

The rotor 3, which functions as a field magnet, rotates with a shaft 6, and includes a Lundell-type pole core 7, a field coil 8, slip rings 9, 10, a mixed flow fan 11, and a centrifugal fan 12 as air blowing devices. The shaft 6 is connected to a pulley 20, and rotated by an onboard engine (not shown) for driving a vehicle.

The Lundell-type pole core 7 is constructed of a pair of pole cores. The Lundell-type pole core 7 includes a boss portion 71, which is fixed to the shaft 6, disc portions 72, which extend from the ends of the boss portion 71 in the radial direction, and twelve claw poles 73.

The mixed flow fan 11 adjacent to the pulley 20 includes blades that are arranged at acute angles and blades that are arranged at right angles to a base plate 11a, which is fixed to an end surface of the pole core 7 such as by welding. The mixed flow fan 11 rotates with the rotor 3. The centrifugal fan 12 on a side opposite to the pulley 20 only includes blades that are arranged at right angles to a base plate 12a, which is fixed to an end surface of the pole core 7 such as by welding.

The housing 4 includes a front housing 4a and a rear housing 4b. The housing 4 forms air inlet holes 41 on its axial end surfaces. Also, the housing 4 forms cooling air outlet holes 42 on its shoulder portions corresponding to the radially outer peripheries of a first coil ends 31a and a second coil ends 31b of the stator 2. The front housing 4a and the rear housing 4b are fastened together with bolts 4c, for example.

The rectifier 5 rectifies an AC voltage outputted from the stator 2 to a DC voltage. The rectifier 5 is fixed to the end on the side opposite to the pulley in the vehicular alternator 1.

Next, the stator 2 will be described in detail. The stator 2 functions as an armature and includes a stator winding 31, the stator core 32, and insulators 34. The stator winding 31 is constructed of the conductor segments 33 as a plurality of electric conductors that are arranged in slots 35 of the stator core 32. The insulators 34 provide electrical insulation between the stator core 32 and the stator winding 31.

Figure 2:
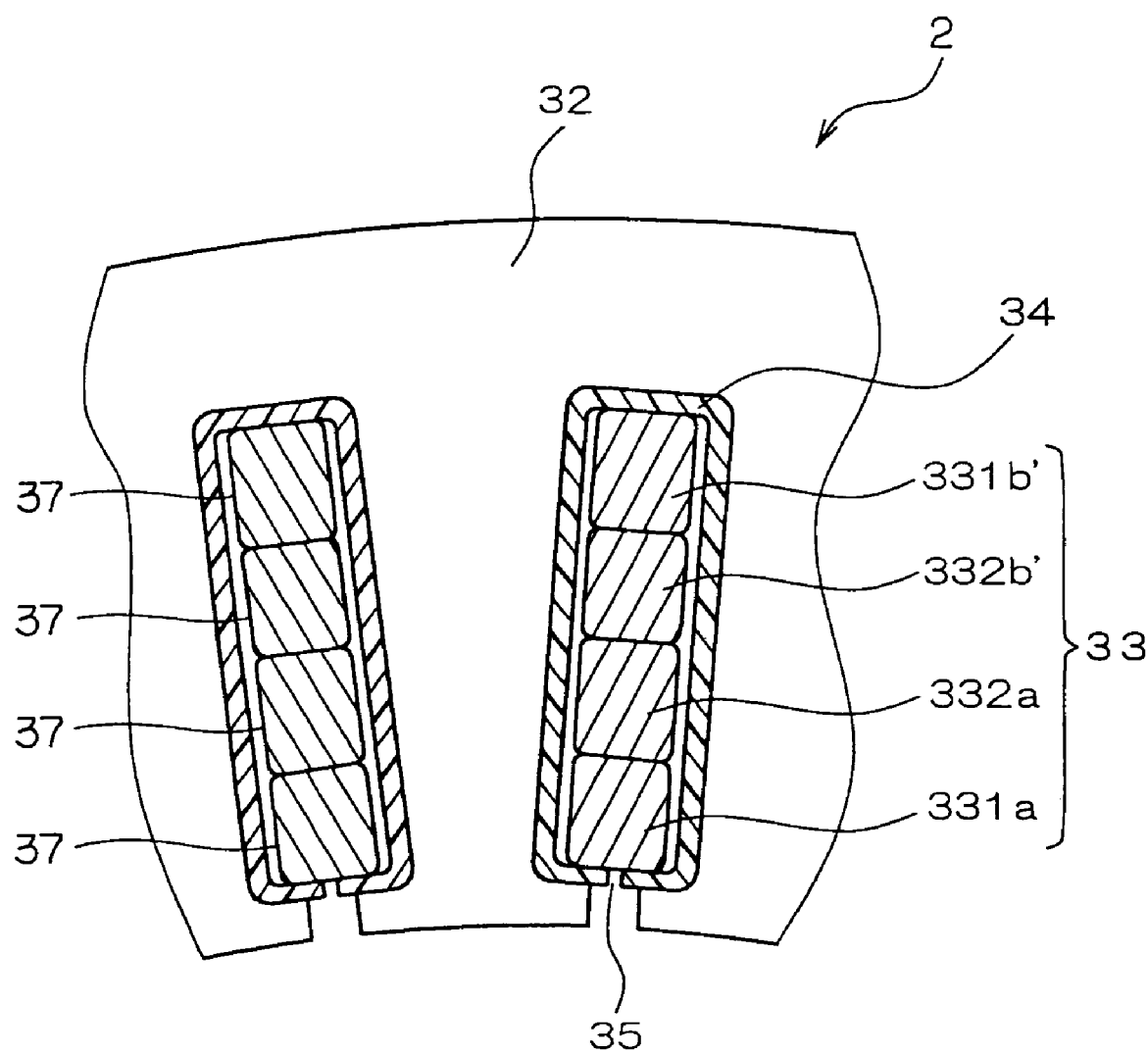
FIG. 2 is a cross-sectional view of a part of a stator according to the embodiment of the present invention.

As shown in FIG. 2, the stator core 32 is formed with the plurality of slots 35 with openings on the inner diameter side for holding the multi-phase stator winding 31. In this embodiment, thirty-six slots 35, corresponding to the number of the poles of the rotor 3, are arranged at regular intervals for holding the three-phase stator winding 31.

The stator winding 31, which is held in the slots 35 of the stator core 32, can be grasped as a group of electric conductors, and even numbered electric conductors (four in this embodiment) are held in each slot 35, as shown in FIG. 2. The four electric conductors in the slot 35 are arranged in line in order of inner end layer, inner middle layer, outer middle layer, and outer end layer from the inner diameter side in the direction along the radius of the stator core 32. The electric conductors are coated with insulating films 37 such as a polyamide-imide resin film.

The electric conductors are connected in predetermined patterns, thereby constructing the stator winding 31. In this embodiment, the electric conductors held in the slots 35 are connected through continuous turn portions at a side of the first coil end 31a and connected by joining end portions, which are opposite to the continuous turn portions, at a side of the second coil end 31b.

One of the electric conductors in each slot 35 pairs up with another electric conductor in another slot 35 that is a predetermined pole-pitch away. Specifically, an electric conductor in a specific layer in the slot 35 pairs up with an electric conductor in another layer in another slot 35 that is a predetermined pole-pitch away, in order to maintain gaps between the plurality of electric conductors at the coil ends and line them.

For example, an electric conductor 331a in the inner end layer in one slot pairs up with the electric conductor 331b in the outer end layer in another slot 35 that is one pole-pitch away in the clockwise direction of the stator core 32. Likewise, an electric conductor 332a in the inner middle layer in one slot 35 pairs up with another electric conductor 332b in the outer middle layer in another slot 35 that is one pole-pitch away in the clockwise direction of the stator core 32.

The paired electric conductors are connected through turn portions 331c, 332c at one of the axial ends of the stator core 32 by using continuous wires. Therefore, the continuous wire that connects the electric conductor in the outer middle layer and the electric conductor in the inner middle layer is surrounded by the continuous wire that connects the electric conductor in the outer end layer and the electric conductor in the inner end layer, at one of the axial ends of the stator core 32.

In this way, the portions for connecting the paired electric conductors are surrounded by the portions for connecting another paired electric conductors held in the same slot, at the axial end of the stator core 32. By connecting the electric conductor in the outer middle layer and the electric conductor in the inner middle layer, a middle layer coil end is formed. By connection of the electric conductor in the outer end layer and the electric conductor in the inner end layer, an outer layer coil end is formed.

On the other hand, the electric conductor 332a in the inner middle layer in the slot 35 also pairs up with an electric conductor 331a' in the inner end layer in another slot 35 that is one pole-pitch away in the clockwise direction of the stator core 32. Likewise, an electric conductor 331b' in the outer end layer in the slot 35 pairs up with the electric conductor 332*b* in the outer middle layer in another slot 35 that is one pole-pitch away in the clockwise direction of the stator core 32. These electric conductors are connected together at the opposite axial end of the stator core 32 by welding.

Therefore, at the opposite axial end of the stator core 32, a joining portion that connects the electric conductor in the outer end layer and the electric conductor in the outer middle layer and a connecting portion that connect the electric conductor in the inner end layer and the electric conductor in the inner middle layer are arranged in the radius direction of the stator core 32.

Adjacent layer coil ends are formed by connecting the electric conductors in the outer end layer and the electric conductors in the outer middle layer, and by connecting the electric conductors in the inner end layer and the electric conductors in the inner middle layer. In this way, at the opposite axial end of the stator core 32, the joining portions of the paired electric conductors are arranged without overlapping.

Furthermore, the electric conductors are provided from U-shaped conductor segments. The U-shaped conductor segments are produced by forming electric wires having substantially rectangular-shaped cross-section and constant thickness (hereinafter, a flat wire) into predetermined shapes.

Figure 3:
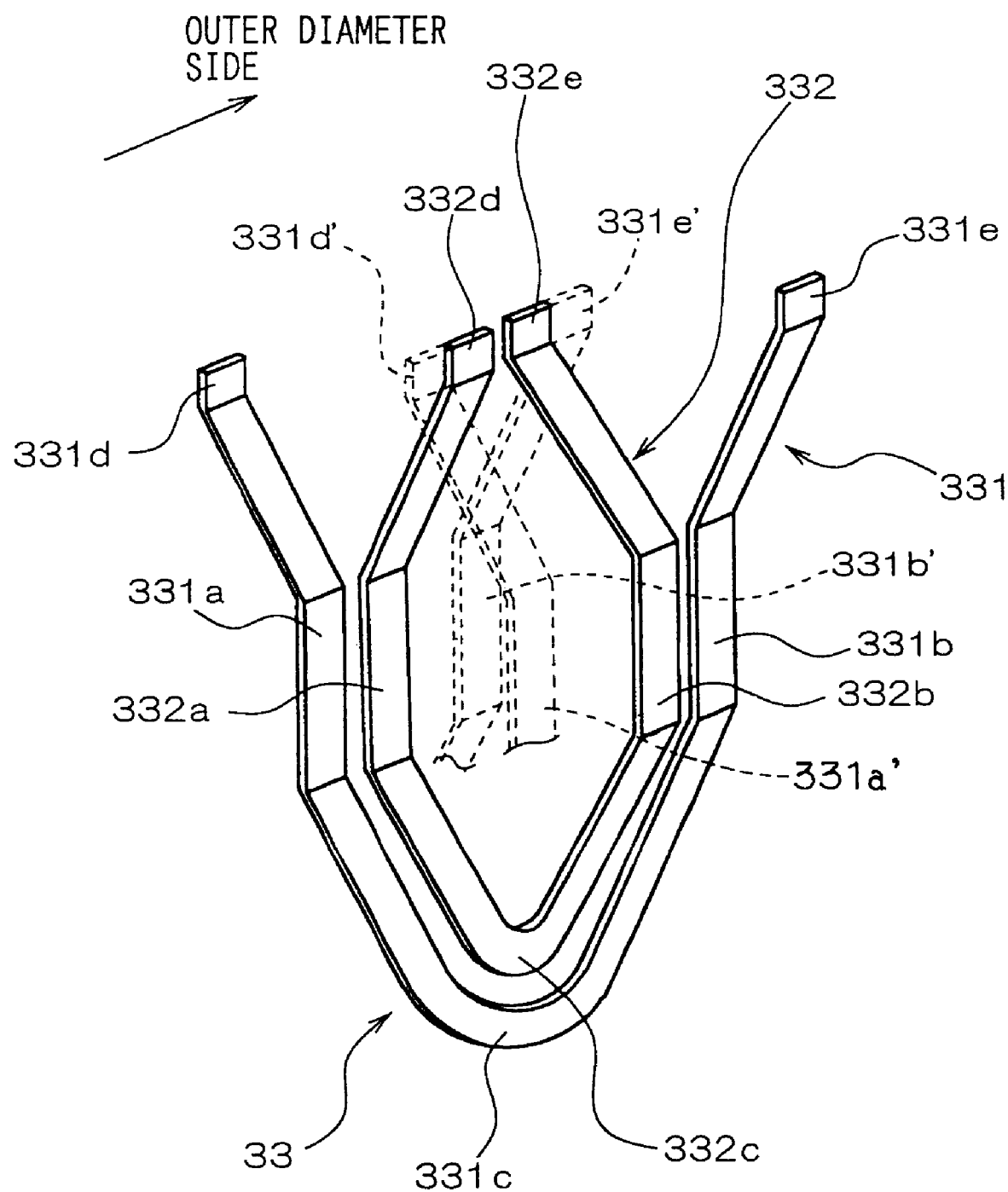
FIG. 3 is a perspective view of conductor segments for showing schematic configuration when mounted in a stator core according to the embodiment of the present invention.

As shown in FIG. 3, the electric conductors in the inner end layer and the outer end layer are provided from a large segment 331. The electric conductors in the inner middle layer and the outer middle layer are provided from a small segment 332. The large segment 331 and the small segment 332 are produced by shaping the wire into substantially a U-shape.

The large segment 331 and the small segment 332 construct the base conductor segments 33. The base conductor segments 33 are arranged regularly in the slots 35 so that a coil that turns twice around the stator core 32 is constructed. However, the conductor segments that include lead-out wires of the stator winding and turn portions connecting the first and the second laps are constructed of special shape conductor segments, which are in different shape from the base conductor segments 33.

In this embodiment, three special shape conductor segments are provided. The connection between the first and the second laps is made between the electric conductors in the end layer and the middle layer. By this connection, special shape coil ends are formed.

Next, a process of manufacturing the stator winding 31 will be described.

(Segment Forming Step)

Figure 4:
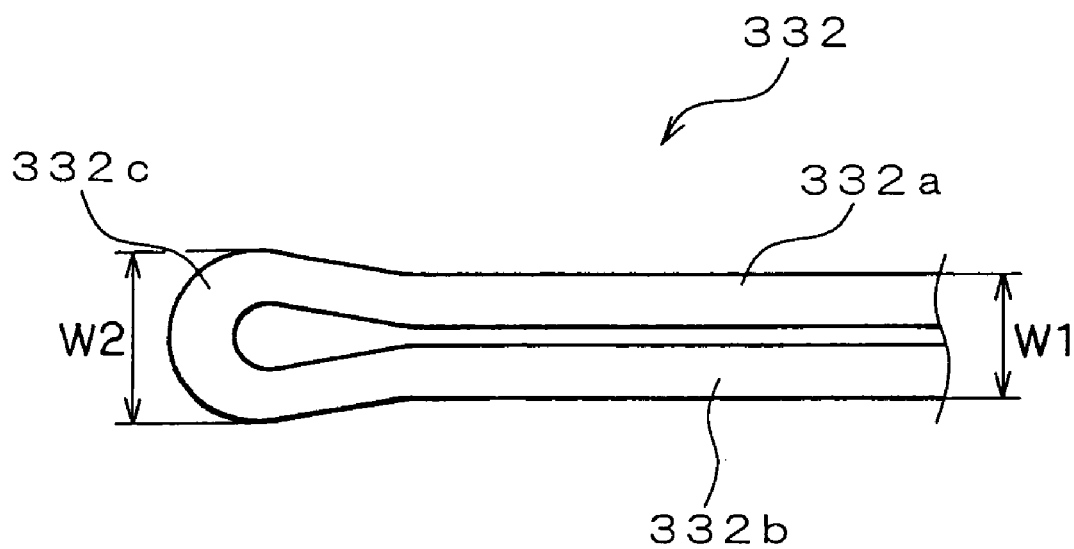
FIG. 4 is a schematic illustration of a small segment produced by a segment-forming step according to the embodiment of the present invention.

A longitudinal or continuous wire is partly bent along a core member, and cut, thereby producing the U-shaped large segment 331 and the U-shaped small segment 332. FIG. 4 is a schematic view of the small segment 332 and FIG. 5 is a schematic view of the large segment 331.

Since the small segment 332 is formed by bending the wire along the core member having a predetermined radius, an inside diameter or dimension of the turn portion 332*c* is inconsistent with an outside diameter of the core member. The inside dimension of the turn portion 332*c* is larger for some amount to restrict breakage such as cracks of the insulation film 37 around the turn portion 332*c*. Thus, a maximum width W2 of the turn portion 332*c* that is perpendicular to longitudinal directions of the straight portions 332*a*, 332*b* is greater than an overall width W1 of the straight portions 332*a*, 332*b* including a gap between them.

Figure 5:
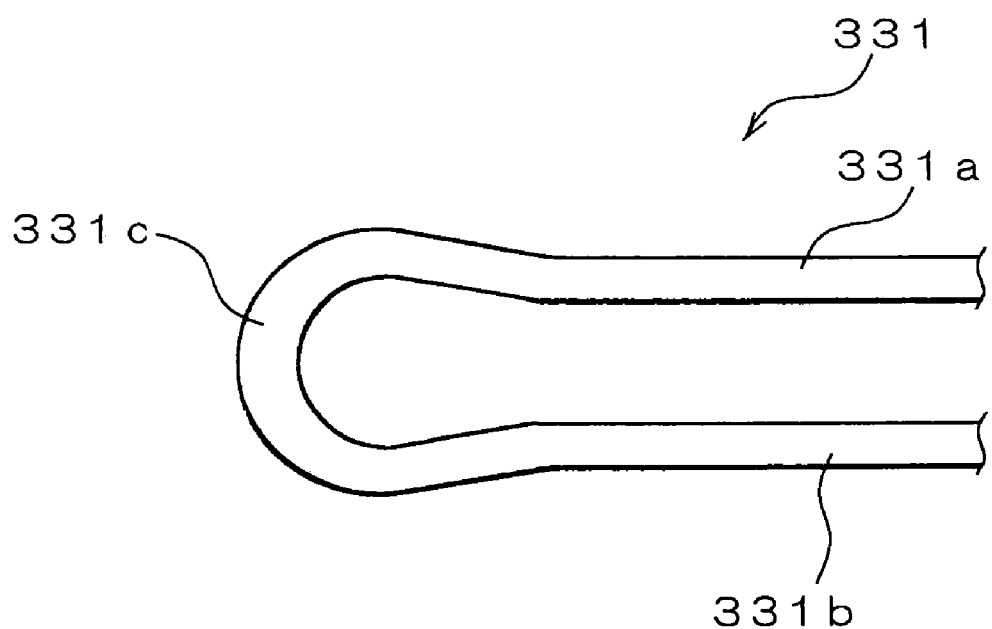
FIG. 5 is a schematic illustration of a large segment produced by the segment-forming step according to the embodiment of the present invention.

As shown in FIG. 5, the large segment 331 is produced by bending the wire along the core member that has an outside diameter slightly larger than the maximum width W2 of the turn portion 332*c* of the small segment 332. The large segment 331 is shaped to surround the small segment 332 entirely.

(Twisting Step, Shaping Step)

The small segment 332 and the large segment 331 are arranged such that the turn portion 332*c* of the small segment 332 is surrounded by the turn portion 331*c* of the large segment 331. In this condition, the straight portions 331*a*, 331*b*, 332*a*, 332*b* of the small segment 331 and the large segment 332 are inserted in jigs 111, 112 (described later) of a turn portion twisting apparatus 100. Then, the large segment 331 and the small segment 332 are twisted into a predetermined shape by turning the jigs 111, 112 in opposite directions. In each of the segments 331, 332, the straight portions are moved relative to each other in opposite circumferential directions about a center point. The large segment 331 and the small segment 332 are twisted at the same time.

Also, simultaneous with the twisting step, the shaping step (pressing step) is performed. In the shaping step, the turn portions 331*c*, 332*c* are press-shaped to reduce dimensions of the turn portions 331*c*, 332*c* in their radial directions. The twisting step and the shaping step will be described later in detail.

(Inserting Step)

Figure 6:
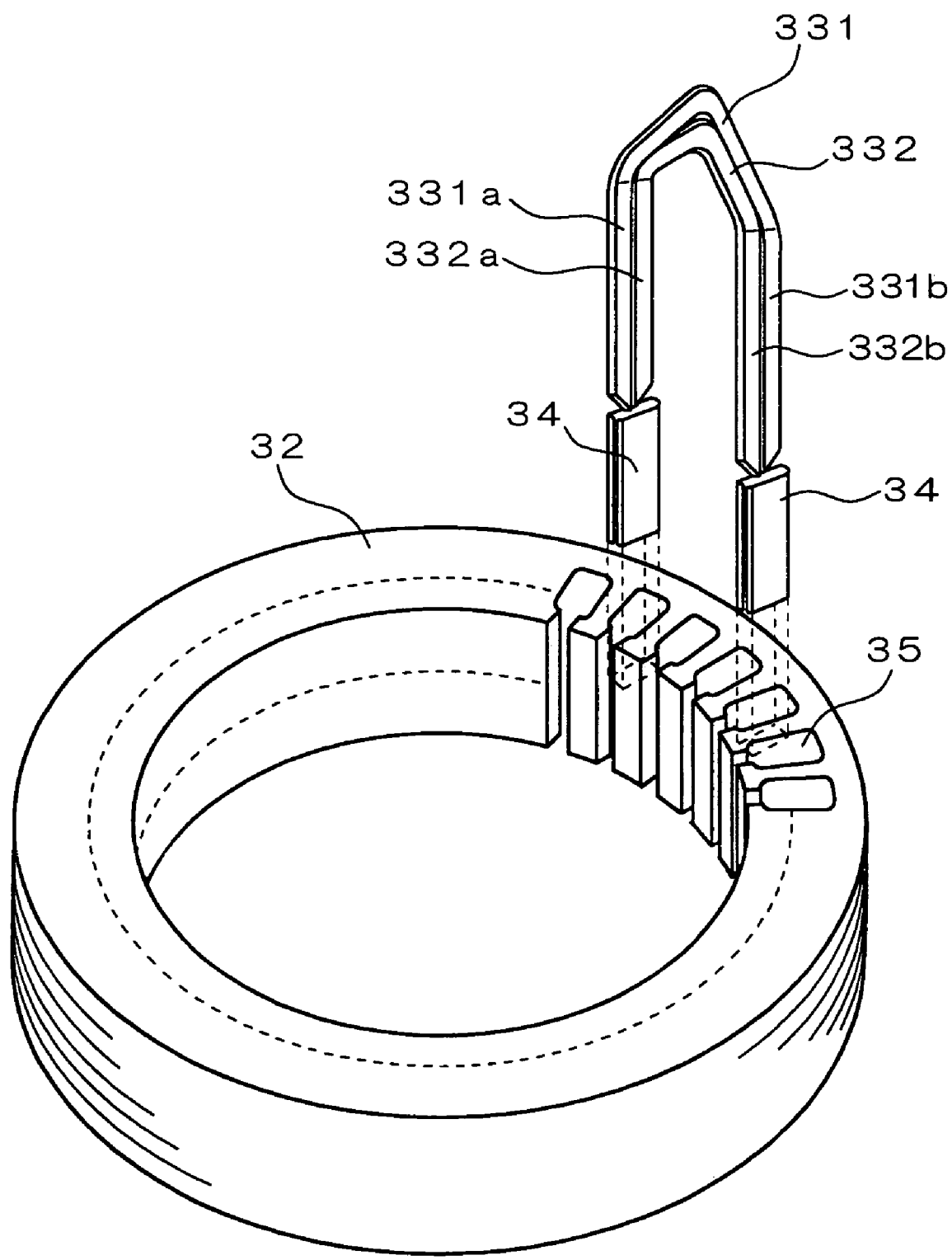
FIG. 6 is a schematic illustration for explaining an inserting step according to the embodiment of the present invention.

After the twisting, in the condition that the large segment 331 and the small segment 332 are arranged such that the small segment 332 is surrounded with the large segment 331, the large segment 331 and the small segment 332 are inserted into two different slots 35 from one of the axial ends of the stator core 32, as shown in FIG. 6.

At this time, the straight portion 331*a* is inserted in the inner end layer in the slot 35 of the stator core 32. The straight portion 332*a* is inserted in the inner middle layer 32 of the same slot 35. The straight portion 331*b* of the large segment 331 is inserted in the outer end layer of another slot 35 that is one-pole pitch away in the clockwise of the stator core 32. The straight portion 332*b* of the small segment 332 is inserted in the outer middle layer in that another slot 35.

As a result, straight portions 331*a*, 332*a*, 332*b*′ and 331*b*′ of the electric conductors are arranged in line in the slot from the order from the inner end layer in the radial direction, as shown in FIG. 2. Here, the straight portions 332*b*′, 331*b*′ are the straight portions of the small and large segments, and are paired up with the straight portions that are inserted in another slot one-pole pitch away, respectively.

(Bending Step)

After the inserting, in the second coil end 31*b*, the straight portions 331*a*, 331*b*, which are in the end layers, are bent such that joining portions 331*d*, 331*e* are inclined for half-pole pitch (one and half slot in this embodiment) in a direction that the large segment 331 opens. Also, the straight portions 332*a*, 332*b*, which are in the middle layers, are bent such that the joining portions 332*d*, 332*e* are inclined for half-pole pitch in the direction that the small segment 332 closes.

As a result, in the second coil end 31*b*, the electric conductors adjacent in the radial direction are inclined in opposite directions to each other along the circumference of the stator core 32. The bending steps are repeated for all conductor segments 33 held in the slots 35.

(Joining Step)

Figure 7:
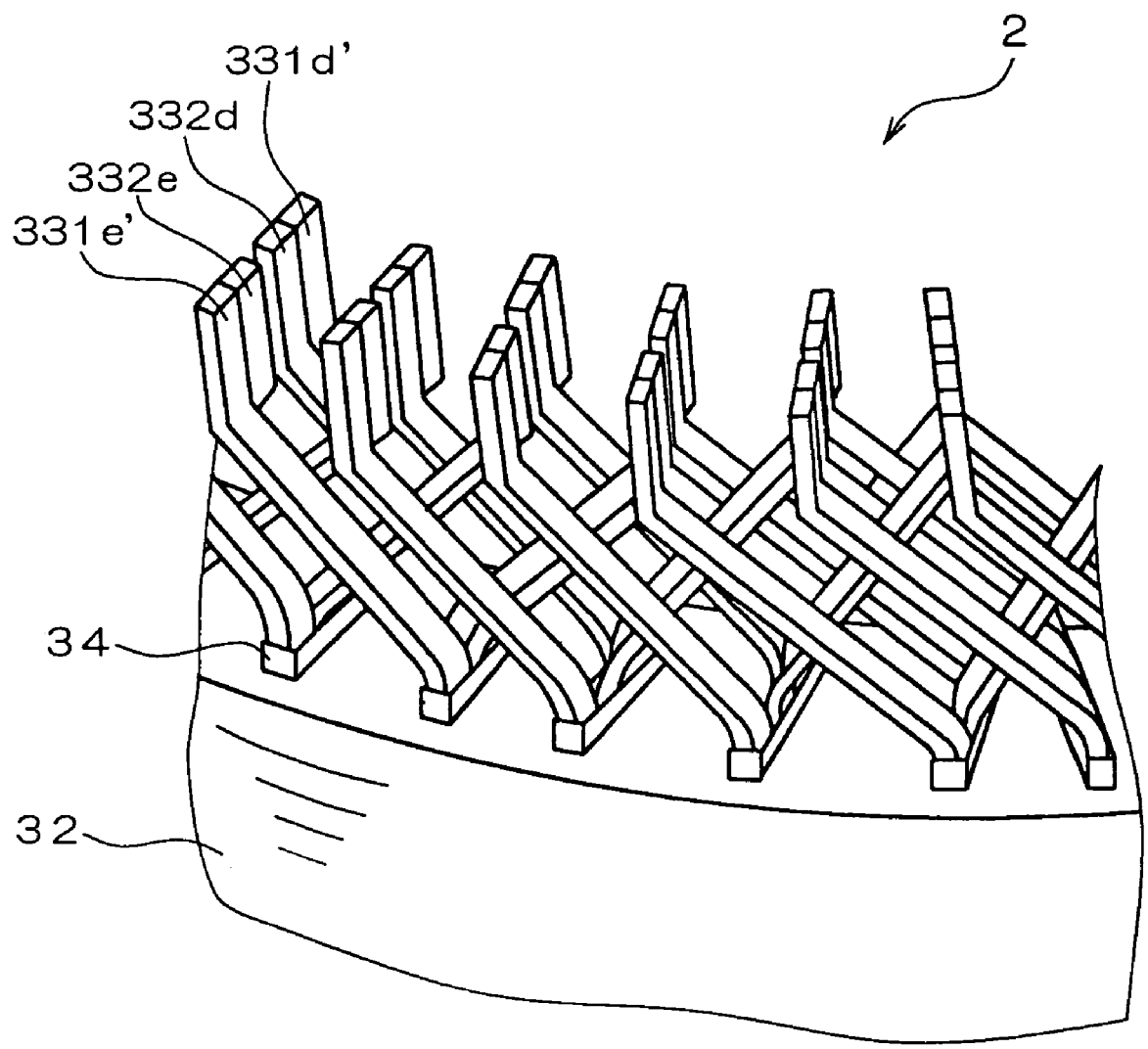
FIG. 7 is a perspective view of a part of the stator for showing joining portions of a stator winding according to the embodiment of the present invention.

After joining, in the second coil end 31*b*, the joining portion 331*e*′ in the outer end layer and the joining portion 332e in the outer middle layer are joined together by welding, such as ultrasonic welding, arc welding and brazing, and by other methods, to have electrical continuity. The joining portion 332d in the inner middle layer and the joining portion 331d' in the inner end layer are joined together in a similar manner. In this way, the stator 2 shown in FIG. 7 is produced.

Hereinafter, the twisting step and the shaping step are described more in detail.

Figure 8:
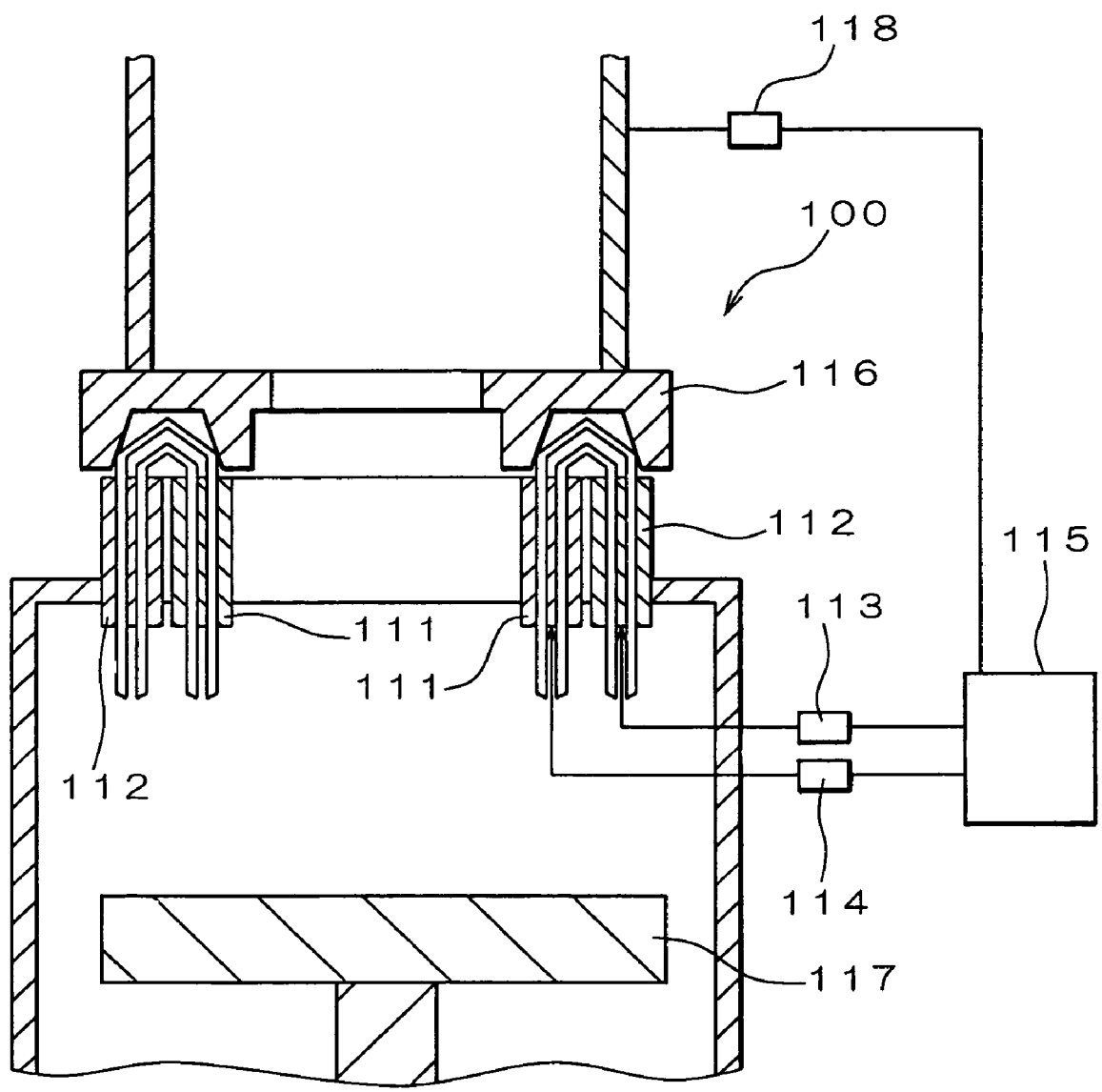
FIG. 8 is a schematic diagram of a turn portion twisting apparatus for twisting a turn portion of the conductor segments according to the embodiment of the present invention.

As shown in FIG. 8, the turn portion twisting apparatus 100 includes the inside jig 111, the outside jig 112, rotation actuating mechanisms 113, 114 for respectively rotating the inside jig 111 and the outside jig 112, a controller 115, an annular segment press 116, a segment thrusting device 117, a rise and fall actuating device 118, and the like.

Figure 9:
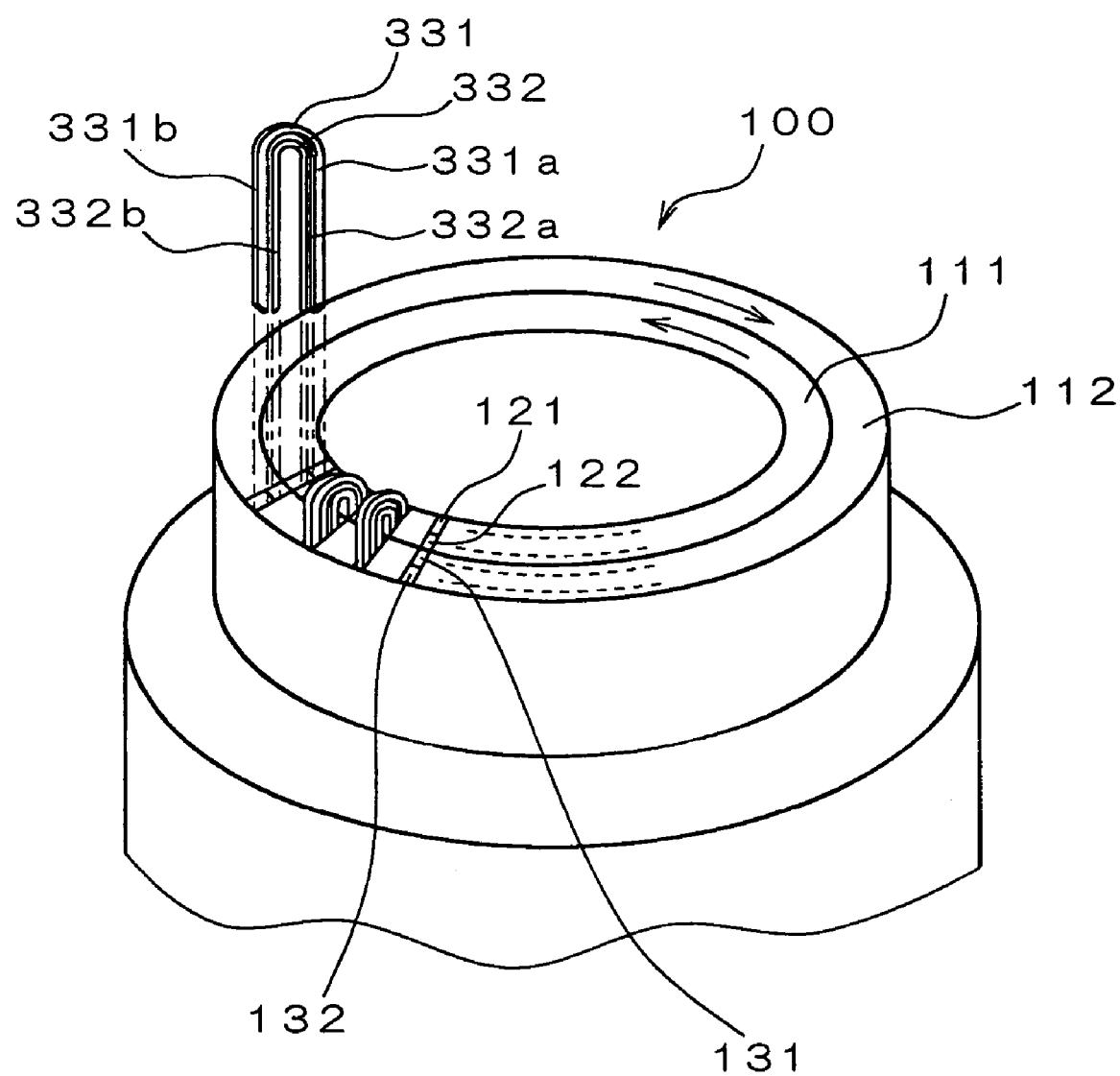
FIG. 9 is a perspective view of a main part of the turn portion twisting apparatus according to the embodiment of the present invention.

As shown in FIG. 9, the inside jig 111 is formed with segment insertion holes 121, 122 in which the straight portions 331a, 332a of the large segment 331 and the small segment 332 are inserted and held. The segment insertion holes 121, 122 are contiguous to each other in a radial direction of the inside jig 111. The numbers of the respective segment insertion holes 121, 122 correspond to the number of the slots 35 of the stator core 2 (thirty-six in the embodiment). The insertion holes 121, 122 are arranged in a circumferential direction of the inside jig 111 at equal intervals. In the embodiment, thirty-six holes 121 and thirty-six holes 122 are respectively formed concentrically.

Similar to the inside jig 111, the outside jig 112 is formed with thirty-six segment insertion holes 131 and thirty-six segment insertion holes 132 that are arranged concentrically and at equal intervals in the circumferential direction of the outside jig 112. As a result, in the inside jig 111 and the outside jig 112, four segment insertion holes 121, 122, 131, and 132 are formed in line from the inner diameter side of the inside jig 111 to the outer diameter side of the outside jig 112.

As shown in FIG. 9, pairs of the large segments 331 and the small segments 332 are arranged in the circumferential direction of the jigs 111, 112 and set in the segment insertion holes 121, 122, 131, 132.

After all the large segments 331 and the small segments 332 are inserted in the segment insertion holes 121, 122, 131, 132, the segment press 116 is moved down from the top of the inside jig 111 and the outside jig 112, and brought into contact with the turn portions 331c of the large segments 331. Therefore, in the twisting step, the large segments 331 and the small segments 332 are restricted from rising from the segment insertion holes 121, 122, 131, 132.

Figure 10:
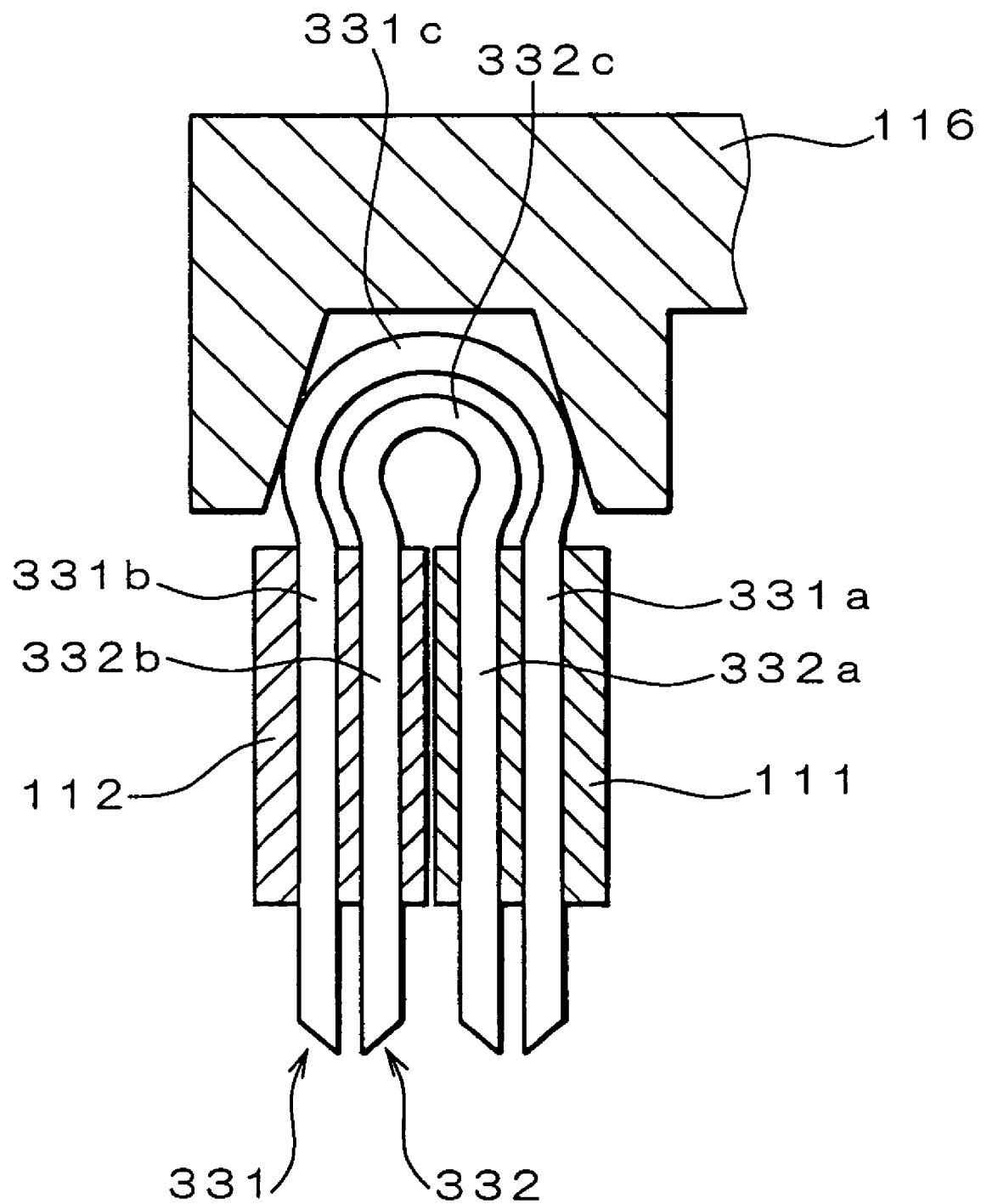
FIG. 10 is a cross-sectional view of a part of a segment press according to the embodiment of the present invention.

As shown in FIG. 10, the segment press 116 has a tapered cross-section an opening of which is narrowed toward the bottom (to the top). In addition to a function for restricting the large segments 331 and the small segments 332 from rising, the segment press 116 has a function as a shaping die (first pressing member) that performs the shaping step. That is, when the segment press 116 is moved down by operation of the rise and fall actuating mechanism 118 during the twisting step, the turn portions 331c, 332c are pressed obliquely from the top and altered toward the centers of curves.

The inside jig 111 and the outside jig 112 are respectively rotated by the rotation actuating mechanisms 113, 114 controlled by the controller 115. In the embodiment, in viewing from the top of the turn portion twisting apparatus 100, the inside jig 111 and the outside jig 112 are rotated a half pole pitch (one and a half slot in the embodiment) clockwise and in a counterclockwise, respectively. At the same time as the rotation of the dies 111, 112, the segment press 116 is moved down by the rise and fall driving mechanism 118 controlled by the controller 115, so that the turn portions 331 c and the turn portions 332c are press-shaped.

In this way, in the embodiment, the turn portions 331c, 332c are shaped by the press-shaping at the same time as the twisting step. Therefore, even if the stator winding 31 is formed by the conductor segments 33 having large turn portions 331c, 332c, the projecting amount of the turn portions 331c, 332c in the radial direction of the stator core 32 can be reduced. Thus, an outside diameter and an inside diameter of the winding 31 can be reduced. Further, the shaping step is performed simultaneously with the twisting step, stress to the turn portions 331c, 332c is reduced.

Also, the inside gap or dimension of the turn portion 332c before the twisting can be set large for some amount. That is, the maximum width W2 of the turn portion 332c is larger than the overall width W1 of the straight portions 332a, 332b, as shown in FIG. 4. Therefore, stress to the inner periphery of the turn portion 332c can be reduced. As a result, the breakage of the insulation films 37 around the turn portion 332c reduces.

In the shaping step, the segment press 116 is used as the pressing member. The contact surfaces of the segment press 116, which are brought into contact with the turn portions 331c, are inclined with respect to the pressing direction, that is, the moving direction of the segment press 116. Therefore, the turn portions 331c, 332c can be shaped only by moving the segment press 116 against the turn portions 331c, 332c. Accordingly, working contents in the shaping step is simple.

Further, the segment press 116 also used as the restricting member to restrict the turn portions 331c, 332c from rising from the inside jig 111 and the outside jig 112 in the twisting step. Therefore, the number of the component parts reduces and the turn portion twisting apparatus has simple structure. Also, a manufacturing cost reduces. In addition, the turn portions 331c, 332c can be shaped by the segment press 116 at the same time as the twisting. Therefore, the process of manufacturing the winding 31 can be simplified.

Figure 11:
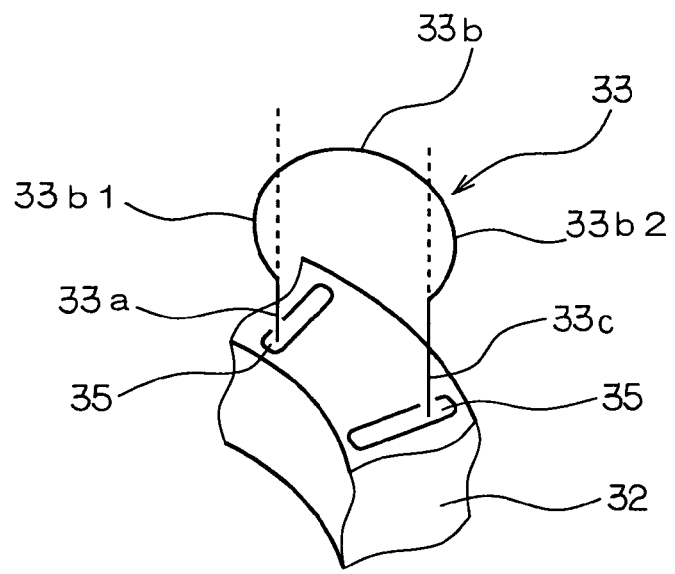
FIG. 11 is an explanatory diagram for explaining a concept of a method of manufacturing the stator winding according to the embodiment of the present invention.
Figure 12:
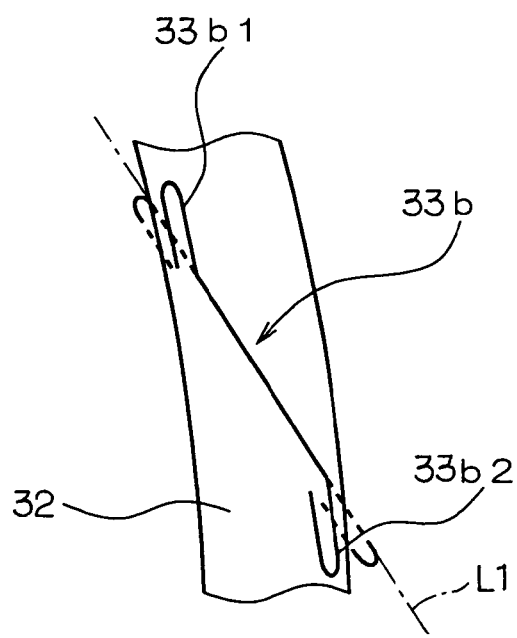
FIG. 12 is an explanatory diagram for explaining the concept of the method of manufacturing the stator winding according to the embodiment of the present invention.

FIGS. 11 and 12 are explanation views for explaining concepts of the method of manufacturing the stator winding 31 of the embodiment. In FIG. 11, the configuration of the conductor segment 33 to be inserted in the stator core 32 is illustrated. In FIG. 12, the conductor segment 33 viewed from the axial end of the stator core 32 is illustrated.

As shown in FIG. 11, the conductor segment 33 of the embodiment includes straight portions 33a, 33c held in the two different slots 35 at different positions in the radial direction of the stator core 32 and a curved portion 33b connecting between the straight portions 33a, 33c. The curved portion 33b includes a first curve 33b1 and a second curve 33b2 protruding from the straight portions 33a, 33c, respectively, in directions substantially perpendicular to the longitudinal directions of the straight portions 33a, 33c.

Specifically, the straight portion 33a is held adjacent to the inside diameter of the stator core 32 in the slot 35 and the straight portion 33c is held adjacent to the outside diameter of the stator core 32 in the slot 35. The first curve 33b1 and the second curve 33b2 are disposed to protrude from the straight portion 33a, 33c in directions separating from the slots 35 in the circumferential direction of the stator core 32 when viewed from the axial end of the stator core 32, respectively.

As shown in FIG. 12, the first curve 33b1 and the second curve 33b2 are inclined oppositely to each other with respect to a longitudinal direction L1 of the curved portion 33b other than the first curve 33b1 and the second curve 33b2. Thus, the first curve 33b1 and the second curve 33b2 are inclined to be close to or along the circumferential direction of the stator core 32.

Accordingly, the turn portions of the stator winding 31, which construct the first coil end 31a, are formed of the curved portions 33b having the first curves 33b1 and the second curves 33b2. Further, the first curve 33b1 and the second curve 33b2 are inclined, as shown in FIG. 12. Therefore, the projecting amount of the first and the second curves 33b1, 33b2 in the radial direction of the stator core 32 can be reduced without causing an increase in the stress concentration at inner peripheral portions of the curved portions 33b.

Further, since the first curve 33b1 and the second curve 33b2 are inclined to be close to or along the circumferential direction of the stator core 32, the inside diameter and the outside diameter of the winding 31 are reduced. Therefore, it is less likely that the winding 31 will interference with other components arranged on the radially inside and the radially outside of the winding 31, such as the housing 4 and the rotor 3.

When the conductor segment 33 is produced from the flat wire, stress is easily concentrated in the inner peripheral side of the curved portion 33b. In the embodiment, since the curved portion 33b is partly inclined by the shaping step, the width or dimension of the curved portion 33b before the shaping step can be set large. Even if thick or wide flat wire is used, stress concentration at the curved portion 33b can be reduced by setting the dimension of the curved portion 33b large. Further, the turn portion is restricted from protruding partly in the radial direction of the stator core 32.

In the examples shown in FIGS. 11 and 12, the curved portion 33b includes the first curve 33b1 and the second curve 33b2 on the inner diameter side and the outer diameter side, respectively. However, it is not always necessary to have curves on both the sides. It is possible to have the curve on one of the inner diameter side and the outer diameter side.

Further, in the examples shown in FIGS. 11 and 12, the conductor segment 33 produced from the flat wire having the rectangular-shaped cross-section is used. It may be possible that the straight portions 33a, 33c and the curved portion 33b are included partly in a continuous wire.

In the shaping step, the turn portions 331c, 332c are pressed from both the sides in the radial direction by the inclined contact surfaces (pressing surfaces) of the segment press 116. However, the turn portions 331c, 332c can also be pressed only at a side where the projection is to be reduced, for example. Further, an inclination angle of the pressing surface is changed, so that a pressing direction and a shaping amount (deformation) can be controlled.

Figure 13:
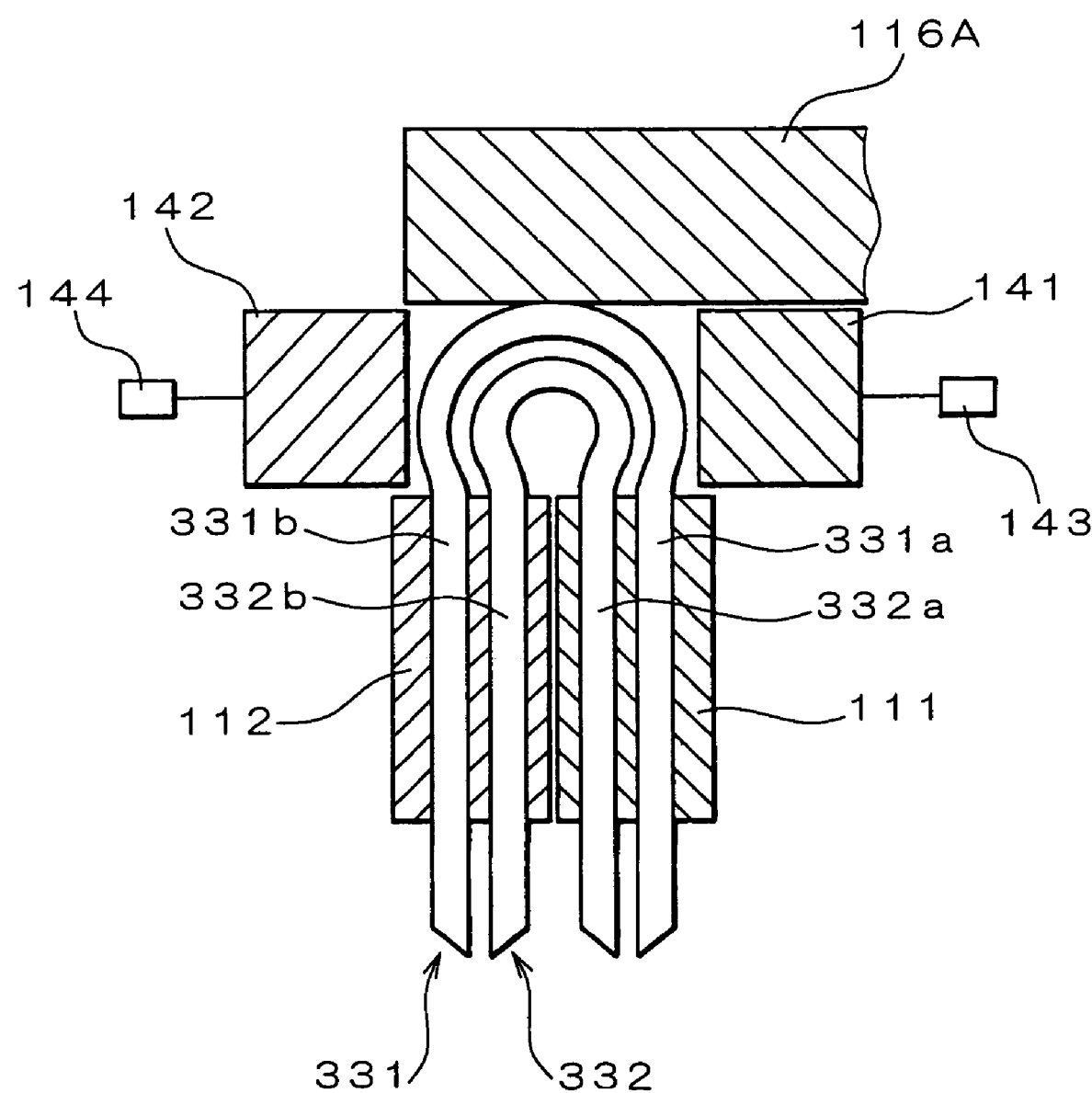
FIG. 13 is a schematic diagram of a modification of the turn portion twisting apparatus.

FIG. 13 is a schematic diagram of a modification of the turn portion twisting apparatus 100. The turn portion twisting apparatus shown in FIG. 13 includes a segment press 116A and dies 141, 142 as the pressing members (second pressing members).

The dies 141, 142 are operated in the radial direction by actuators 143, 144, respectively. The die 141 presses the turn portions 331c, 332c from the radially inside to the radially outside with respect to the radial directions of the jigs 111, 112. The die 142 presses the turn portions 331c, 332c from the radially outside to the radially inside with respect to the radial directions of the jigs 111, 112.

In a case that the inner diameter sides and the outer diameter sides of the turn portions 331c, 332c are pressed in the radius direction by the separate dies 141, 142, it is possible to shape the turn portions 331c, 332c partly as required. Therefore, it increases flexibility in designing. It is not always necessary to provide both the dies 141, 142. For example, if only one of the radially inside and the radially outside of the turn portions 331c, 332c needs to be pressed, only one of the dies 141, 142 is provided.

In the embodiment, the stator winding 31 is produced by the layered large segment 331 and the small segment 332. However, the present invention can be employed in a case that the stator winding is produced by non-layered (single) U-shaped conductor segments and triplet layered U-shaped conductor segments.

Further, the twisting step is performed simultaneously with the shaping step. However, the shaping step (pressing step) can be preformed after completion of the twisting step. Alternatively, the shaping step can be performed before the twisting step. Further, the shaping step can be performed after the inserting step.

In the embodiment, the method of manufacturing the stator winding 31 for the vehicular alternator is described. However, the present invention can be employed to produce various types of windings for other rotary electric machines.

The present invention should not be limited to the disclosed embodiments, but may be implemented in other ways without departing from the spirit of the invention.

What is claimed is:

1. A method of manufacturing a winding comprising:
    forming a substantially U-shaped electric conductor by bending a longitudinal wire so that the U-shaped electric conductor has a first straight portion, a second straight portion and a turn portion that includes a first curve portion and a second curve portion each protruding in a direction perpendicular to longitudinal directions of the first straight portion and the second straight portion;
    inclining the first curve portion and the second curve portion with respect to a longitudinal direction of the turn portion when viewed along the longitudinal directions of the first straight portion and the second straight portion by bending the conductor such that the plane containing the first curve portion is rotated about an axis defined by the longitudinal direction of the first straight portion, and the plane containing the second curve portion is rotated about an axis defined by the longitudinal direction of the second straight portion, so that the first curve portion and the second curve portion incline oppositely to each other with respect to the longitudinal direction of the turn portion; and
    maintaining un-inclined a section of the turn portion between the first curve portion and the second curve portion thereby forming the winding.

2. The method according to claim 1, further comprising:
    twisting the U-shaped electric conductor by moving the first straight portion and the second straight portion, which lie in planes parallel to each other, in directions 180 degrees from each other yet in their respective planes.

3. The method according to claim 2,
    wherein the inclining and the twisting are performed simultaneously.

4. The method according to claim 2,
    wherein the twisting is performed after the inclining.

5. The method according to claim 2, wherein the twisting is performed before the inclining.

6. The method according to claim 1, further comprising:
    mounting the electric conductor on a stator core having slots extending in a radial direction of the stator core such that the first straight portion and the second straight portion are held in different slots and at different radial positions and the turn portion connects therebetween at an axial end of the stator core,
wherein the first and second curve portions of the turn portion are inclined in a circumferential direction of the stator core.

7. The method according to claim 6,
wherein the first and second curve portions are inclined by pressing.

* * * * *